United States Patent [19]

Hansel et al.

[11] 3,958,591
[45] May 25, 1976

[54] QUICK RESPONSE FLOAT VALVE FOR USE IN VAPOR RETURN LINES

[75] Inventors: William B. Hansel, Media; Walter D. Wagner, Chaddsford, both of Pa.

[73] Assignee: Sun Oil Company of Pennsylvania, Philadelphia, Pa.

[22] Filed: Apr. 28, 1975

[21] Appl. No.: 572,028

Related U.S. Application Data

[63] Continuation-in-part of Ser. No. 538,053, Jan. 2, 1975, Continuation-in-part of Ser. No. 538,057, Jan. 2, 1975.

[52] U.S. Cl.................................. 137/202; 137/433
[51] Int. Cl.²....................................... F16K 31/22
[58] Field of Search ........... 137/202, 433; 73/322.5, 73/319

[56] References Cited

UNITED STATES PATENTS 2,325,956  8/1943  Holtman ........................ 137/433 X

FOREIGN PATENTS OR APPLICATIONS 1,185,880  1/1965  Germany ........................... 137/202

Primary Examiner—Alan Cohan
Attorney, Agent, or Firm—J. Edward Hess; Donald R. Johnson; Gary V. Pack

[57] ABSTRACT

A float valve for use in the vapor return lines of a vapor recovery system for liquid hydrocarbon storage facilities is disclosed. This valve is designed to prevent vapors from flowing against the float and to quickly close when the liquid level reaches the float.

4 Claims, 4 Drawing Figures

FIG. 2.
FIG. 3.
FIG. 4.
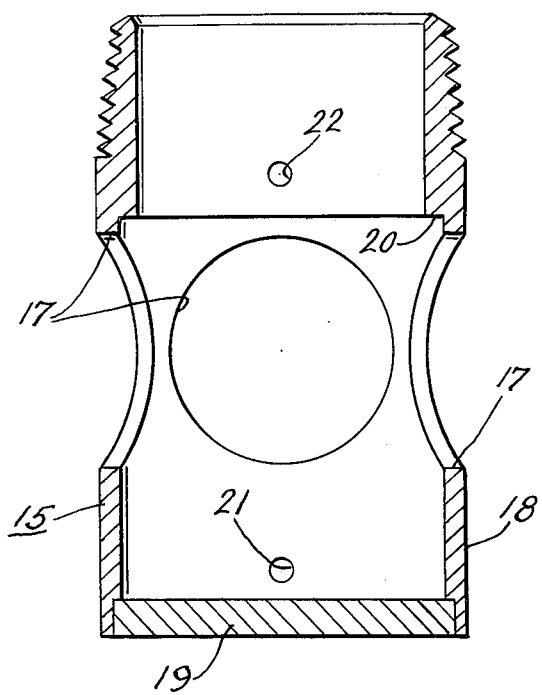
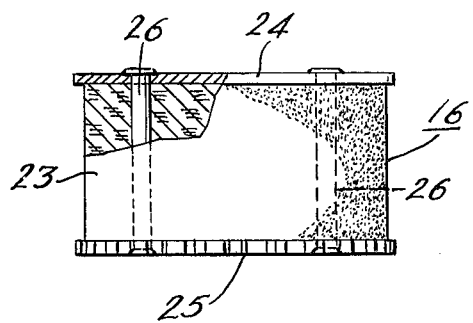
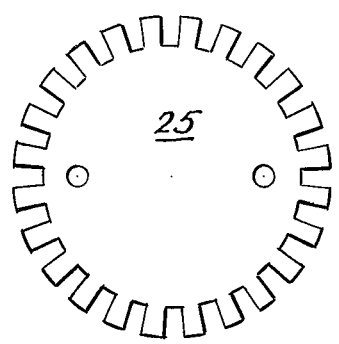

QUICK RESPONSE FLOAT VALVE FOR USE IN VAPOR RETURN LINES

CROSS REFERENCE TO RELATED APPLICATIONS

The float valve disclosed herein is continuation-in-part of the copending application entitled "Float Valve For Use in Vapor Return Lines," Ser. No. 538,053, filed Jan. 2, 1975. In addition, the float valve disclosed herein is designed to operate preferably in a vapor recovery system as is disclosed in copending application entitled, "Vapor Recovery System for Service Stations," Ser. No. 538,057, filed Jan. 2, 1975, the disclosure of which is herein incorporated by reference.

BACKGROUND OF THE INVENTION

1. Field of the Invention

This invention relates to float valves and more particularly to float valves which are designed for use in vapor recovery lines in gasoline storage tank facilities. The float housing is specially designed to prevent the valve from closing when vapors are passing through the valve and to close when the liquid level reaches the float. A special float design permits quick opening and closing the valve.

2. Description of Prior Art

A great amount of hydrocarbon vapor is often generated in hydrocarbon storage tanks, especially when the tanks are nearly empty. Current environmental regulations will require the collection of this vapor when these tanks are filled. Many vapor recovery systems have been proposed and are being used. Some of these systems manifold together the existing vent lines from each tank and collect the vapors through this manifold. To prevent overflow of the contents of one of the tanks into the next tank through this manifold, a valve is required. For proper operation this valve must meet several requirements.

One requirement for this valve is that it cannot close during periods of high vapor velocity or the loading of the tank will be restricted. A second requirement is that the valve seat and float must have a shape which permits proper sealing, yet will not become jammed due to the forces created by having the vapors in a large tank concentrated in a small vent line. A third consideration is that the float must be able to move between its open and its closed position freely and quickly to prevent a minimum amount of liquid from passing through the valve. A fourth consideration is to keep the float properly aligned within its housing so that it will not become stuck during its operation.

No valve is presently known which can provide all of these requirements.

SUMMARY

In accordance with a preferred embodiment, a valve is disclosed which meets the requirements enumerated above. A float valve is provided which has a float housing designed to shield the side and the bottom surfaces of the float when it is in its lower or open position. This design prevents high velocity hydrocarbon vapors from prematurely closing the valve.

In addition, a float having a hard, flat upper surface is provided to prevent the float from lodging in the valve seat. A cork float, or other similar substance, is used since its density is low enough to permit floating on liquid hydrocarbon. A solid metal disc mounted on top of the cork engages the valve seat.

Inherent in a float valve having this float housing design is the problem on inhibiting the motion of the float due to inability of the liquid to flow freely around and under the float, thereby slowing its reaction time. Therefore, a disc with a slotted edge is provided to be mounted to the bottom of the cork float. This design permits liquid to flow through the slots and under the float.

Use of the slotted disc on the bottom of the float also permits proper alignment of the float in the float housing so that the float can freely move up in the float housing to engage the valve seat without being snagged.

A better understanding of this invention and its advantages can be seen in the following descriptions of the figures and the preferred embodiment.

DESCRIPTION OF DRAWINGS AND PREFERRED EMBODIMENT

FIG. 2 shows a cross-section of the float housing along the line 2—2.

FIG. 3 shows a partial section of the float.

FIG. 4 shows a detached plan view of the bottom, slotted disc illustrated in FIG. 3.

Figure 1:
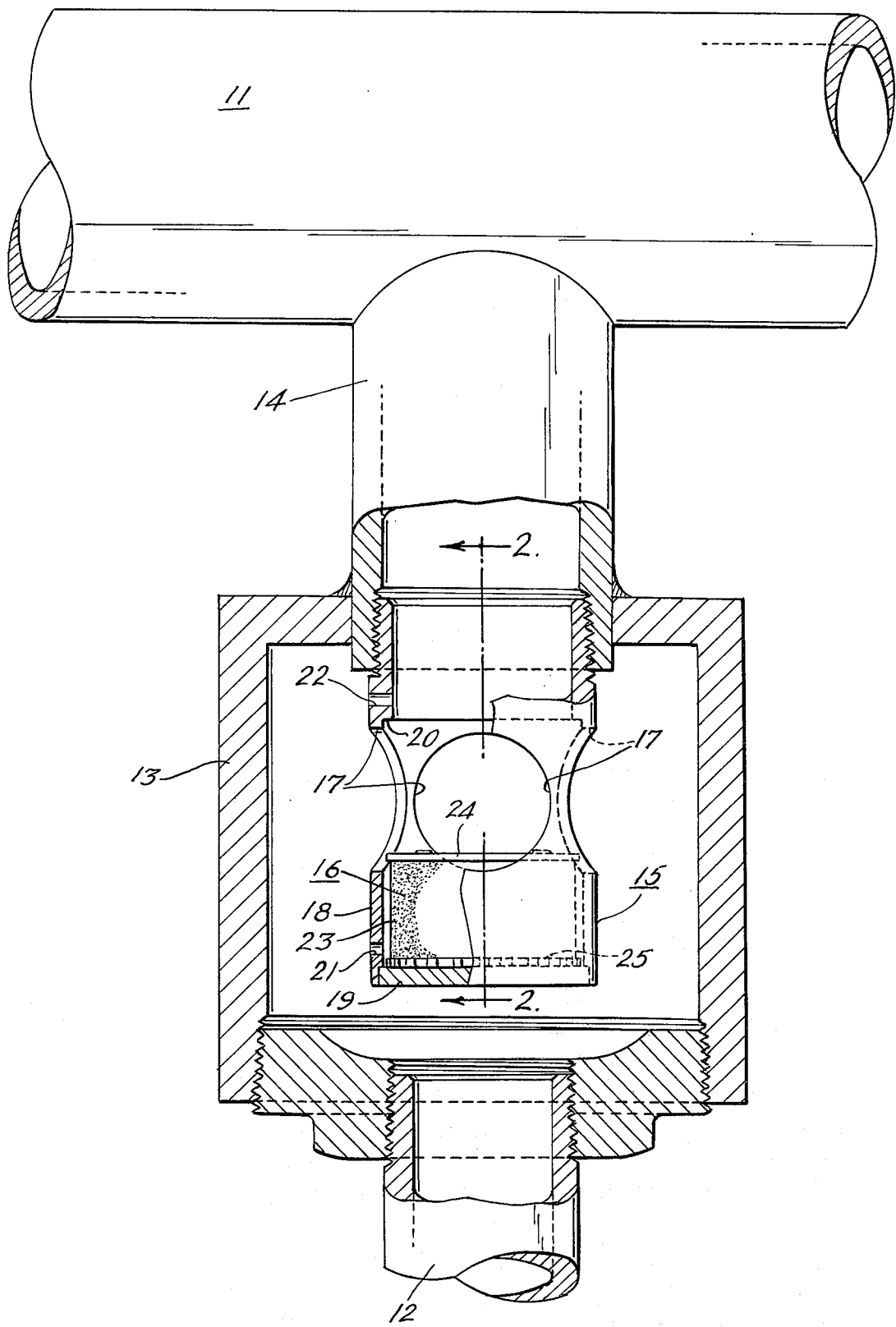
FIG. 1 shows a partial sectional view of a float valve according to this invention and a possible manner of installation.

One possible manner of using the float valve disclosed herein is in a vapor recovery system using a manifold, a section of which is illustrated in FIG. 1. A manifold 11 receives vent lines 12 from each storage tank for hydrocarbons. Vent line 12 enters a valve housing 13 which is connected to manifold 11 by pipe coupling 14. Float housing 15 is located inside valve housing 13 and is threadedly attached to the inside of pipe coupling 14. Float 16 rests inside float housing 15.

FIG. 2 shows a cross-section of float housing 15. The float housing can be generally cylindrical in shape having solid sidewalls except for several apertures, 17. Apertures 17 are so located to form a side closure 18 at the bottom end of float housing 15. Side closure 18 should extend upward from the bottom of float housing 15 a distance sufficient to cover most of the side of float 16 when it rests in the bottom of float housing 15 in its open position. This distance can be slightly less than the height of float 16, as shown in FIG. 1, or can extend above the height of the float. Preferably, apertures 17 have a size and are spaced around the sidewall of float housing 15 so as to provide maximum vapor flow path as well as sufficient structural strength between valve seat 20 and side closure 18. A plate 19 forms the bottom of float housing 15, thereby cooperating with side closure 18 to form a shield around the side and bottom of float 16 to prevent hydrocarbon vapors from flowing against the float.

To complete the construction of float housing 15, a valve seat, 20, is formed around the inside circumference of float housing 15, immediately above the apertures 17. Drain hole 21 is located in side closure 18 to provide a means for allowing liquid hydrocarbon to flow into and out of float housing 15. Bleed hole 22 is located in float housing 15 above valve seat 20. In case the storage tank is overfilled, some of the liquid will be able to pass through bleed hole 22 so that the remainder of the product in the tank truck fill hose can be received.

The preferred float design is illustrated in FIG. 3. A floating section 23, is made out of material which will float in liquid hydrocarbons, such as high density cork. Floating section 23 preferably has a flat top and bottom upon which are mounted hard, flat discs, 24 and 25, by tubular rivets 27. Discs 24 and 25 preferably have a size and shape nearly that of the inside of float housing 15, in order to maintain the alignment of float 16 during times of opening and closing.

To aid in the ease with which float 16 moves up and down, floating section 23 should preferably have a cross-sectional size less than discs 24 and 25 so that liquid can flow around the float. In addition, a most important consideration is to improve the response with which the float moves up and down in side closure 18, by permitting the uninhibited flow of liquid under the float when the float is rising. This is accomplished by having a plurality of slots formed around the circumference of the lower disc, 25. In this manner liquid can flow into the space under the float when the float rises and liquid can flow from this space when the float falls back into the bottom of float housing 15. It is obvious that slots having various shapes other than that illustrated can be used to perform this function.

When filling a storage tank, hydrocarbon vapor flows through vent line 12, valve housing 13, apertures 17 of float housing 15, pipe coupling 14, manifold 11 and through a vapor return line and hose leading to a tank truck (not shown). A high velocity flow of hydrocarbon vapors is developed since all the vapors contained in the large storage tank are forced through a small vent line. This is not a problem with the valve disclosed herein since the float is shielded from this flow of vapors and cannot be forced against the valve seat.

When liquid reaches float housing 15, for example when tanks are overfilled, float 16 starts to rise when liquid flows through drain hole 21. Float 16 engages valve seat 20 when the liquid level rises high enough. Because disc 24 is hard and flat, it will not become lodged in valve seat 20.

The liquid level in vent line 12 and in valve housing 13 tends to rise very fast because the size of the line is so much smaller than the size of the storage tank. The use of a slotted lower disc, 25, on the float improves the response time for closing the valve, thereby preventing excessive amounts of liquid from passing through the valve before it closes.

While a particular embodiment of this invention has been shown and described, it is obvious that changes and modifications can be made without departing from the true spirit and scope of the invention. It is the intention of the appended claims to cover all such changes and modifications.

The invention claimed is:

1. A float valve, for use in an environment having hydrocarbon fluid in both a liquid and a vapor state, at a location which experiences hydrocarbon liquid flow and high velocity vapor flow, said float valve designed to close when liquid enters the valve and to remain open at all other times including periods of high velocity vapor flow, and comprising:
   a. a float comprising:
      i. a floating section having a flat upper surface and a flat lower surface,
      ii. a solid disc mounted on the upper surface of the float and having a smooth and regularly shaped circumference, and
      iii. means for improving the response time of the floating section moving from its open position to its closed position, and including a disc having a plurality of slots located around its circumference, mounted on the bottom of said floating section;
   b. means for preventing said float from being forced upward by the flow of hydrocarbon vapors, and including a float housing having a bottom and side closure covering the bottom and substantially all of the side of said float when the valve is open;
   c. a valve seat formed around the inside of said float housing and directly above the top of said float; and
   d. means defining apertures spaced around said float housing between the valve seat and the top of said float.

2. The float valve as recited in claim 1, wherein said float housing comprises an elongated, cylindrical casing and said solid disc and slotted disc have a cylindrical shape with their diameter approximately the same as the inside diameter of said float housing.

3. The float valve as recited in claim 1, further comprising means for permitting the flow of fluid into and out of the side closure of said float housing, and including means defining at least one drain hole, small in size relative to the apertures and said float.

4. The float valve as recited in claim 1, further comprising means for permitting fluid to bypass the valve seat, and including means defining at least one bleed hole, small in size relative to the apertures and said float, located on the float housing above the valve seat.

* * * * *